(12) United States Patent
Ouzounov

(10) Patent No.: US 10,009,118 B2
(45) Date of Patent: Jun. 26, 2018

(54) DYNAMIC CONFIGURATION OF BODY COUPLED COMMUNICATION DEVICES

(71) Applicant: KONINKLIJKE PHILIPS N.V., Eindhoven (NL)

(72) Inventor: Sotir Filipov Ouzounov, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days. days.

(21) Appl. No.: 15/511,413

(22) PCT Filed: Sep. 23, 2015

(86) PCT No.: PCT/EP2015/071917
§ 371 (c)(1),
(2) Date: Mar. 15, 2017

(87) PCT Pub. No.: WO2016/046287
PCT Pub. Date: Mar. 31, 2016

(65) Prior Publication Data
US 2017/0244494 A1    Aug. 24, 2017

(30) Foreign Application Priority Data
Sep. 23, 2014  (EP) .................................. 14185948

(51) Int. Cl.
*H04B 5/00* (2006.01)
*H04B 13/00* (2006.01)
(Continued)

(52) U.S. Cl.
CPC ......... *H04B 13/005* (2013.01); *H04B 5/0012* (2013.01); *H04W 40/005* (2013.01); *H04W 52/0235* (2013.01)

(58) Field of Classification Search
CPC . H04B 13/005; H04B 5/0015; H04W 40/005; H04W 52/0235
(Continued)

(56) References Cited

U.S. PATENT DOCUMENTS 8,633,809 B2    1/2014   Schenk
2008/0261523 A1* 10/2008 Kubono ............... H04B 13/005
                                                    455/41.1

FOREIGN PATENT DOCUMENTS

CN    CN103391594 A    11/2013
WO    WO2006035351 A2   4/2006
(Continued)

OTHER PUBLICATIONS

Mazloum, N.S., "Body-Coupled Communications Experimental Characterization, Channel Modeling and Physical Layer Design", Master Thesis, Ref. No. EX084/2008, Chalmers University of Technology Philips Research Department of Signals and Systems Distributed Sensor Systems, Dec. 2008.

*Primary Examiner* — Sanh Phu
(74) *Attorney, Agent, or Firm* — Larry Liberchuk

(57) ABSTRACT

A body-coupled communication apparatus (100) comprises a coupler arrangement (10) comprising a plurality of couplers (11,12,13) configured to couple signals (S) between the apparatus (100) and a body (200). Signal electronics (20) are configured to process and/or generate the signals depending on an operational mode (OT,OR,OW) of the apparatus. A routing network (40) is configured to provide variable routing of the signals (S) between the signal electronics (20) and the couplers (11,12,13) thereby providing a selection between distinct coupling modes (CT,CR,CW) of the coupler arrangement (10). A mode selector (30) is configured to switch the apparatus (100) between the operational modes (OT,OR,OW) and control the routing network (40) to select (Continued)

between the distinct coupling modes (CT,CR,CW) based on the operational mode (OT,OR,OW) of the apparatus.

14 Claims, 8 Drawing Sheets

(51) Int. Cl.
    *H04W 40/00*     (2009.01)
    *H04W 52/02*     (2009.01)

(58) Field of Classification Search
    USPC .......................................... 455/41.1
    See application file for complete search history.

(56) References Cited

FOREIGN PATENT DOCUMENTS

| | | |
|---|---|---|
| WO | WO2006054211 A1 | 5/2006 |
| WO | WO2007084807 A1 | 7/2007 |
| WO | WO2007096810 A1 | 8/2007 |
| WO | WO2009081343 A1 | 7/2009 |
| WO | WO2009098631 A1 | 8/2009 |
| WO | WO2009125374 A2 | 10/2009 |
| WO | WO20100146490 A1 | 12/2010 |

* cited by examiner

DYNAMIC CONFIGURATION OF BODY COUPLED COMMUNICATION DEVICES

TECHNICAL FIELD AND BACKGROUND

The present disclosure relates to the field of body-coupled communication, in particular to an apparatus and a method for body-coupled communication.

Body-Coupled Communication (BCC) is an emerging near field communication technology that uses the human (or animal) body to propagate data by wireless communication over the body between devices that are on or in close proximity with the body. The BCC technology has several important characteristics that make it particularly suitable for a wide range of wearable consumer and medical devices. For example, it can address the needs that the current communication approaches struggle with: ease-of-use, privacy, security, high data rate with high energy efficiency Current BCC devices use couplers that for some applications offer a good performance while for other applications can lead to an excessive use of energy, either to transmit higher signal levels, or to detect very low signal levels. On the transmitter side, higher signal levels ensure better signal propagation and higher immunity to noise and interference. The signal levels that the transmitter can generate are typically limited by the available supply voltage. With complicated techniques like voltage boosting, the signal levels can be increased (e.g. doubled). The voltage boosting however, is associated with extra energy consumption and complicated circuit implementation. An optimal coupling of the signals from the transmitter to the environment via the couplers will results in an optimal usage of the energy. On the receiver side, varying signal conditions are typically accommodated via variable gain amplifier which gain is adapted to the strength of the incoming signal. The adaptation of the gain requires control loop that constantly monitors the signal strength and adapts the gain accordingly. This loop introduces higher complexity, cost and power consumption. Further, the operation of loops is associated with reaction time constant which in case of slow response will lead to overload and loss of data. It is desired to reduce power consumption in BCC while still providing reliable communication in various situation.

SUMMARY

A first aspect of the present disclosure provides a body-coupled communication apparatus configured to be placed at or in close proximity to a human or animal body for transmitting and/or receiving signals via the body. The apparatus comprises a coupler arrangement comprising a plurality of couplers configured to couple the signals between the apparatus and the body. The apparatus comprises signal electronics configured to process and/or generate the signal depending on an operational mode of the apparatus. The apparatus comprises a routing network configured to provide variable routing of the signals between the signal electronics and the couplers thereby, by said variable routing, providing a selection between distinct coupling modes of the coupler arrangement. Each distinct coupling mode provides a distinct coupling impedance between the apparatus and the body for coupling the signals therein between. The apparatus comprises a mode selector configured to switch the apparatus between the operational modes and control the routing network to select between the distinct coupling modes based on the operational mode of the apparatus.

A second aspect of the present disclosure provides a method for body-coupled communication. The method comprises placing a body-coupled communication apparatus at or in close proximity to a human or animal body. The method further comprises setting the apparatus to a first operational mode and processing and/or generating signals depending on the operational mode. The method further comprises selecting a first coupling mode determining a coupling impedance between the apparatus and the body. The method further comprises transmitting and/or receiving the signals via the body in the first operational mode by coupling the signals between the apparatus and the body in the first coupling mode. The method further comprises switching the apparatus to a second operational mode and selecting a second coupling modes based on the second operational mode of the apparatus, wherein the second coupling mode provides a different coupling impedance between the apparatus and the body than the first coupling mode by a different routing of the signals in the apparatus.

It is recognized that a coupling mode can be optimized to provide optimal coupling to the body for a specific operational mode of the apparatus, e.g. transmitting, receiving, or listening (sleep mode). By providing multiple coupling modes with different coupling, the apparatus may accommodate its coupling efficiency depending on the situation. By controlling the coupling mode based on the operational mode, the coupling can be optimized for each operational mode. By providing a routing network with variable routing between the signal electronics and the couplers, the coupling mode can be influenced by providing a different routing, e.g. between different nodes and couplers and/or via additional circuitry. By the adaptability of the implementation, optimal signal coupling can be realized for different modes of operation, which can result in decreased energy requirements for the communication.

Typically, a coupler arrangement comprises a plurality of separately connectable conductive plates or electrodes acting as the couplers. The plates may be disposed parallel to an outer surface of the apparatus. Also other conductive structures and orientations can be used. The couplers can be connected to different signal electronics in different operating modes. Without wishing to be bound by theory, an improvement from different plate configurations can be due to changes of the equivalent capacitances that determine the signal propagation. For example, a vertical (stacked) configurations of plates is found to provide better coupling to ground through the external outer plate (directed away from the body), while a horizontal (side by side) configurations of plates is found to give better coupling to the body. Further, larger coupling plates are found to result in better coupling for low frequencies, while smaller plates and comb-type structures couple better higher frequency signals. Further, an optimal coupler size or shape may relate with the size of the body part closest to the couplers. For example, when the coupler is touched with one finger, a coupler with comb structure may give a better performance than a plate coupler. Accordingly, the operational mode may be set in dependence of a the type of touch and the routing network can be configured to determine a corresponding optimal coupling mode.

Some of couplers can be used in more than one coupling mode while other couplers may be disconnected in some of the coupling modes. By using one or more of the same couplers as part of different coupling configurations, the total number of couplers can be reduced. The arrangement of couplers can be three dimensional, including plates arranged side by side and/or at different distances with respect to the contacted body. Also combinations are possible. By arranging a pair of plates side by side, a first coupling mode can be provided by applying a voltage between said pair of plates. By providing a third (or further) plate parallel at a distance from the first two plates, another coupling mode can be provided by applying a first voltage to one or both of the first pair of plates and a second voltage to the third plate.

The number, shape, surface, and/or relative orientation of the connected couplers can thus be modified depending on the operational mode of the apparatus. For example, in one operational transmitter mode a transmitter part of the signal electronics may generate the signals which are routed to one or more of the couplers arranged according to a transmitter coupling mode. Some of the same couplers/plates can be re-used in another mode, e.g. receiver mode wherein couplers are connected to a receiver part that processes incoming signals. The arrangement of couplers can be different in the receiving mode than the transmission mode. For example, it can be preferable to use a side by side (horizontal) configuration of plates in the transmission mode while using a stacked (vertical) configuration of plates in the reception mode. The device can also have further modes of operation. For example, a low energy sleep mode can be provided, wherein a wakeup part of the signal electronics is controlled to detect a wakeup signal. Accordingly, the routing network can provide a suitable wakeup coupling mode wherein one or more of the couplers are connected to the wakeup part.

The variable routing may include not only changing connections between the couplers and signal electronics, but may also include further impedance control. For example, the routing network can be configured to provide a coupling mode wherein an impedance control circuit is connected in an electrical pathway between the signal electronics and one or more of the couplers. The impedance control circuit may e.g. influence an input or output impedance of the couplers. For example the circuit may comprise a resonator circuit. In a sleep mode, the resonator circuit can be connected between a wakeup part of the electronics and one or more of the couplers. The resonator circuit can have a resonance frequency coinciding with a frequency of a wake up signal that triggers the wakeup part of the signal electronics to wake the apparatus from an operational sleep mode. Once the apparatus has awoken from the sleep mode, the resonator circuit can be disconnected from the couplers so it does not interfere with other modes of operation, e.g. a main reception mode.

The modes of operation of the apparatus can also be divided in depending on a frequency of the generated or processed signals. For example, a high frequency mode may provide a relatively high data throughput while a low frequency mode can be more reliable or energy efficient. When switching from a high frequency mode to a low frequency mode, or vice versa, the number or surface of the couplers can be varied, e.g. to change a coupling surface depending on the frequency. Also a shape or relative arrangement of the couple surfaces can be varied as a function of frequency. For example, smaller plates and comb-like structures are found useful to efficiently couple high frequency signals while larger plates may better couple low frequency signals.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1:
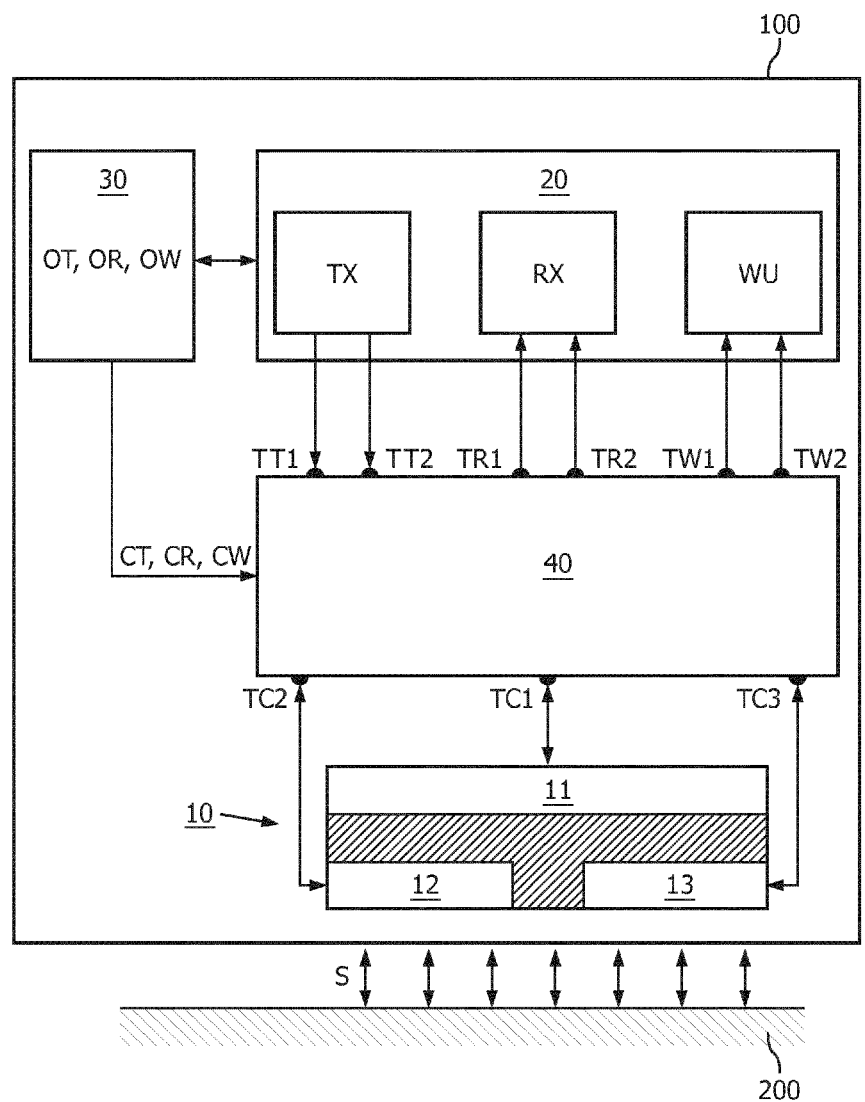
FIG. 1 shows a schematic embodiment of a body-coupled communication apparatus.

The invention is described more fully hereinafter with reference to the accompanying drawings. In the description and drawings, like numbers refer to like elements throughout. Relative terms (e.g. horizontal, vertical) as well as derivatives thereof should be construed to refer to the orientation as then described or as shown in the drawing under discussion. It will be understood that when an (electrical) connection between structures or components is described, this connection may be established directly or through intermediate structures or components unless specified otherwise.

FIG. 1 shows a schematic embodiment of a body-coupled communication apparatus 100. The apparatus is configured to be placed at or in close proximity to a human or animal body 200 for transmitting and/or receiving signals S via the body 200. In one embodiment, the apparatus comprises a coupler arrangement 10 comprising a plurality of couplers 11,12,13 configured to couple the signals S between the apparatus 100 and the body 200. In another or further embodiment, the coupler arrangement 10 comprises a plurality of separately connectable conductive plates acting as the couplers 11,12,13. In another or further embodiment, the plates are disposed parallel to an outer surface of the apparatus 100.

In one embodiment, the apparatus comprises signal electronics 20 configured to process and/or generate the signal depending on an operational mode OT,OR,OW of the apparatus. The signal electronics 20 may comprise for example one or more of a transmitter circuit TX, a receiver circuit RX, and/or a wakeup circuit WU. In one embodiment, the transmitter circuit TX comprises or couples to a signal generator, e.g. voltage or current source. In one embodiment, the receiver circuit RX comprises or couples to a voltage or current sensor. In one embodiment, the wakeup circuit comprises or couples to a voltage or current sensor. The sensor may be shared or separate from that of the receiver circuit. The circuits TX,RX,WY may comprise further shared or dedicated electronics, e.g. passive or active circuitry. For example, one or more amplifiers can be used to boost the received or transmitted signals. Also passive circuitry can be used, e.g. to select and pass specific signals. In one embodiment, the apparatus comprises a routing network 40 configured to provide variable routing of the signals S between the signal electronics 20 and the couplers 11,12,13. The variable routing can provide a selection between distinct coupling modes CT,CR,CW of the coupler arrangement 10. Each distinct coupling mode CT,CR,CW can provide a distinct coupling, e.g. different impedance, between the apparatus and the body 200 for coupling the signals S therein between. In one embodiment, the coupling modes CT,CR,CW are distinguished by a different set of electrical connections between nodes TTx,TRx,TWx of the signal electronics 20 and nodes TC1,TC2,TC3 of the couplers 11,12,13. In another or further embodiment, the coupling modes CT,CR,CW are distinguished by a different coupling impedance, e.g. input or output impedance with the body.

In one embodiment, the apparatus comprises a mode selector 30 configured to switch the apparatus 100 between the operational modes OT,OR,OW and control the routing network 40 to select between the distinct coupling modes CT,CR,CW based on the operational mode OT,OR,OW of the apparatus. In another or further embodiment, the mode selector 30 is operable to switch the apparatus between two or more of an operational transmitter mode OT, an operational receiver mode OR, and/or an operational sleep mode OW, e.g. as illustrated with reference to FIGS. 2A,2B, and 3. Alternatively, or in addition, the mode selector 30 is operable to switch the apparatus between a low frequency mode LFM and a high frequency mode HFM, e.g. as illustrated with reference to FIGS. 4A and 4B. In a further aspect, the figures illustrate methods of body-coupled communication. In one embodiment, the method comprises placing a body-coupled communication apparatus 100 at or in close proximity to a human or animal body 200. The method may further comprise setting the apparatus 100 to a first operational mode OT and processing and/or generating signals S depending on the operational mode OT. The method may further comprise selecting a first coupling mode CT determining a coupling impedance between the apparatus 100 and the body 200. The method may further comprise transmitting and/or receiving the signals S via the body 200 in the first operational mode OT by coupling the signals S between the apparatus 100 and the body 200 in the first coupling mode CT. The method may further comprise switching the apparatus 100 to a second operational mode OR and selecting a second coupling modes CR based on the second operational mode OR of the apparatus, wherein the second coupling mode CR provides a different coupling impedance between the apparatus 100 and the body 200 than the first coupling mode CT by a different routing of the signals in the apparatus 100.

Example embodiments may be implemented in integrated analog and/or digital electronic circuitry, or in computer hardware, firmware, software, or in combinations of them. In one embodiment, a non-transitory computer-readable medium comprises program instructions that when executed by a computer, cause the computer to perform the method as described herein. In some embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

Figure 2A:
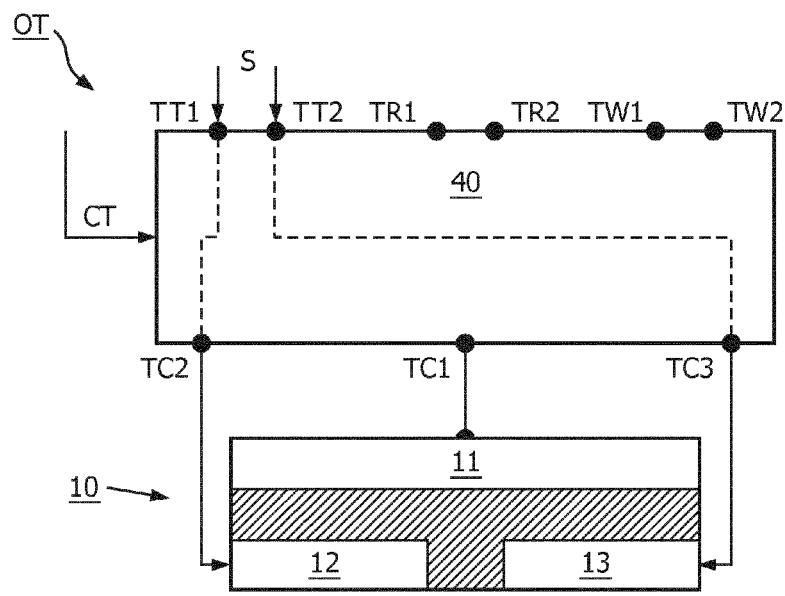
FIGS. 2A and 2B shows embodiments of the apparatus in sending and receiving mode, respectively.

FIG. 2A shows a schematic embodiment of the apparatus 100 in an operational transmitter mode OT. In the transmitter mode, a transmitter part of the signal electronics (TX, shown in FIG. 1) is controlled to generate the signals S. The routing network (40, shown in FIG. 1) is controlled to provide a transmitter coupling mode CT. One or more of the couplers 11,12,13 are connected to the transmitter part TX. In the present embodiment, a horizontal arrangement of side by side couplers 12, 13 is connected, while the coupler 11 is disconnected.

Figure 2B:
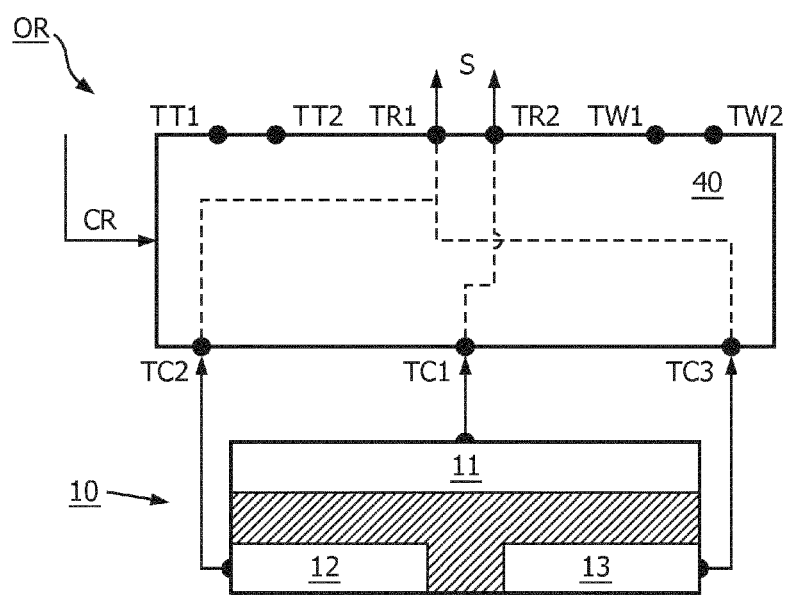

FIG. 2B shows a schematic embodiment of the apparatus 100 in an operational receiver mode OR. In the receiver mode, a receiver part of the signal electronics (RX, shown in FIG. 1) is controlled to process the signals S, and the routing network is controlled to provide a receiver coupling mode CR. In the receiver coupling mode CR one or more of the couplers 11,12,13 are connected to the receiver part RX. In the present embodiment, a vertical arrangement of stacked couplers 11 and 12/13 are connected.

In one embodiment, the routing network 40 is operable to provide at least a first coupling mode CT (e.g. FIG. 2A) wherein a first set 12,13 of the couplers is connected to the signal electronics 20 and a second coupling mode CR (e.g. FIG. 2B) wherein a second set 11,12,13 of the couplers is connected to the signal electronics 20. It will be appreciated that couplers 12,13 are part of both the first set 12,13 and the second set 11,12,13 of couplers. Also further coupling modes can be provided wherein some or all of the couplers are used in more than one mode.

In one embodiment, the routing network 40 is operable to provide at least a first coupling mode CT (e.g. FIG. 2A) wherein a first coupler 12 of the coupler arrangement 10 is connected to a first signal node TT1 of the signal electronics 20 and a second coupling mode CR (FIG. 2B) wherein the first coupler 12 of the coupler arrangement 10 is connected to a second signal node TR2 of the signal electronics that is different than the first signal node TT1. Also further coupling modes can be provided wherein some or all of the couplers are connected to different signal nodes, or the same signal nodes, or combinations thereof.

Figure 3:
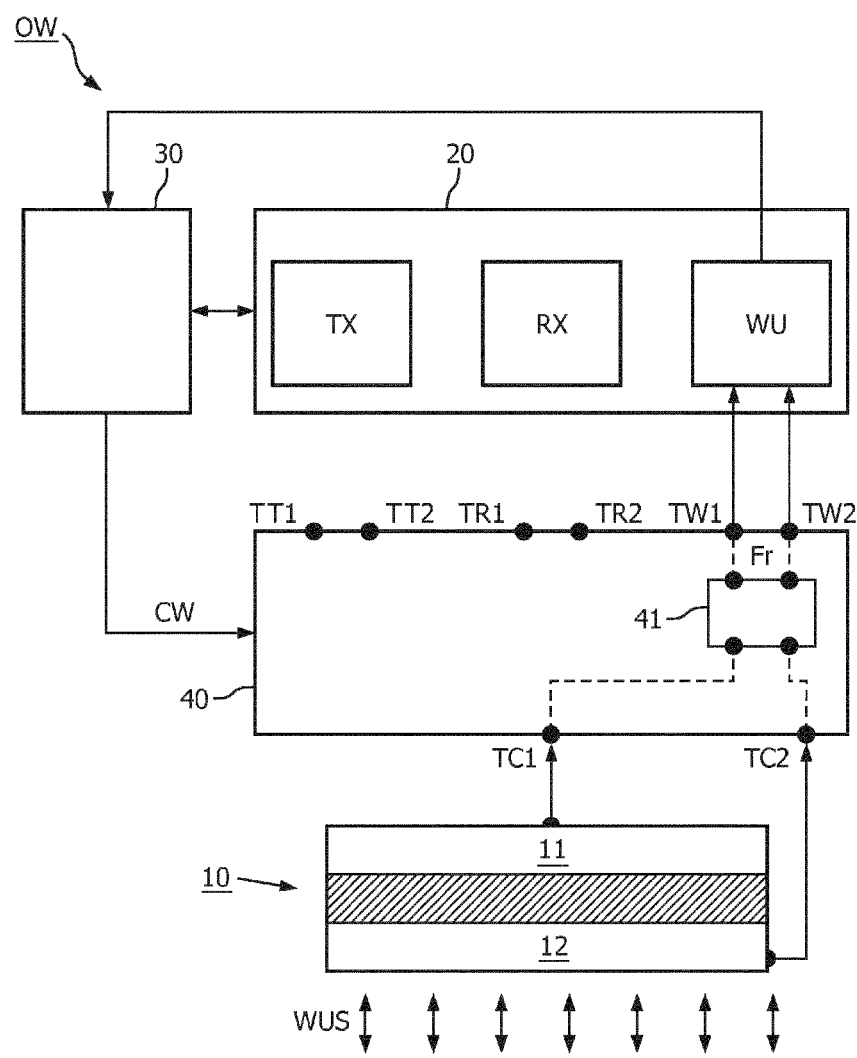
FIG. 3 shows an embodiment of the apparatus in a wakeup mode.

FIG. 3 shows a schematic embodiment of the apparatus 100 in an operational sleep mode OW. In the sleep mode, also referred to as listening mode, a wakeup part WU of the signal electronics 20 is controlled to detect a wakeup signal WUS. The routing network 40 is controlled to provide a wakeup coupling mode CW wherein one or more of the couplers 11,12,13 are connected to the wakeup part WU.

In one embodiment, the routing network 40 is configured to provide a coupling mode CW wherein an impedance control circuit 41 is connected in an electrical pathway between the signal electronics 20 and one or more of the couplers 11,12,13. In one embodiment, the mode selector 30 is operable to switch the apparatus between a low impedance mode and a high impedance mode, wherein the mode selector 30 is configured to control the routing network 40 to change an input or output impedance of the couplers by switching an impedance control circuit 41 between the signal electronics 20 and the couplers 11,12,13.

In one embodiment, the routing network 40 is configured to provide a wakeup coupling mode CW wherein a resonator circuit 41 is connected in an electrical pathway between the wakeup part WU and one or more of the couplers 11,12,13. For example, the resonator circuit 41 has a resonance frequency fr coinciding with a frequency of a wake up signal WUS that triggers the wakeup part WU of the signal electronics 20 to wake the apparatus 100 from an operational sleep mode OW. In one embodiment, the impedance control circuit and/or resonance circuit is a passive circuit, e.g. an RLC circuit comprising one or more of passive electrical elements such as capacitors, resistors, and/or inductors. After waking up, the mode selector 30 may switch the apparatus to a different operating mode, e.g. a main reception mode, and control the routing network 40 to select a different coupling mode, e.g. omitting or replacing the pathway via the resonator circuit 41.

Figure 4A:
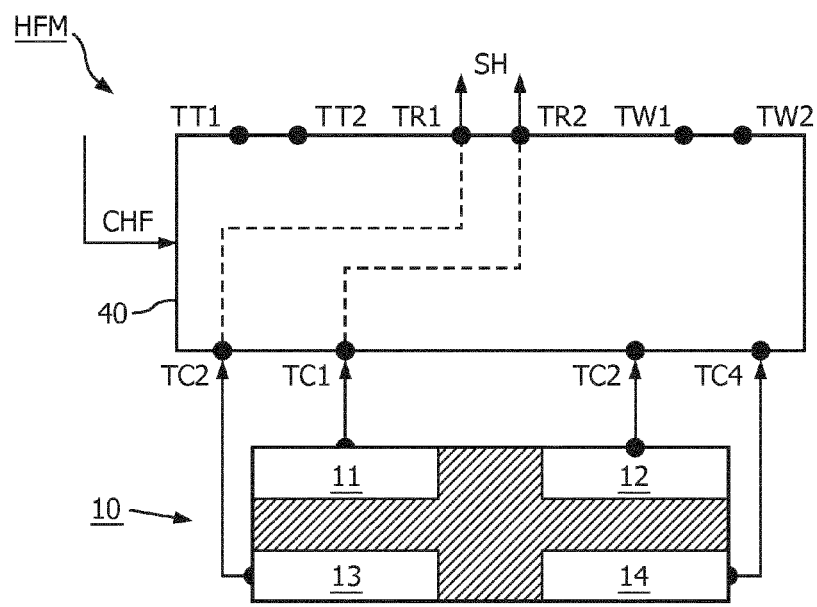
FIGS. 4A and 4B shows embodiments of the apparatus in high- and low frequency modes, respectively.

FIG. 4A shows a schematic embodiment of the apparatus 100 in a high frequency mode HFM wherein the signal electronics 20 are configured to operate with relatively high frequency signals SH.

Figure 4B:
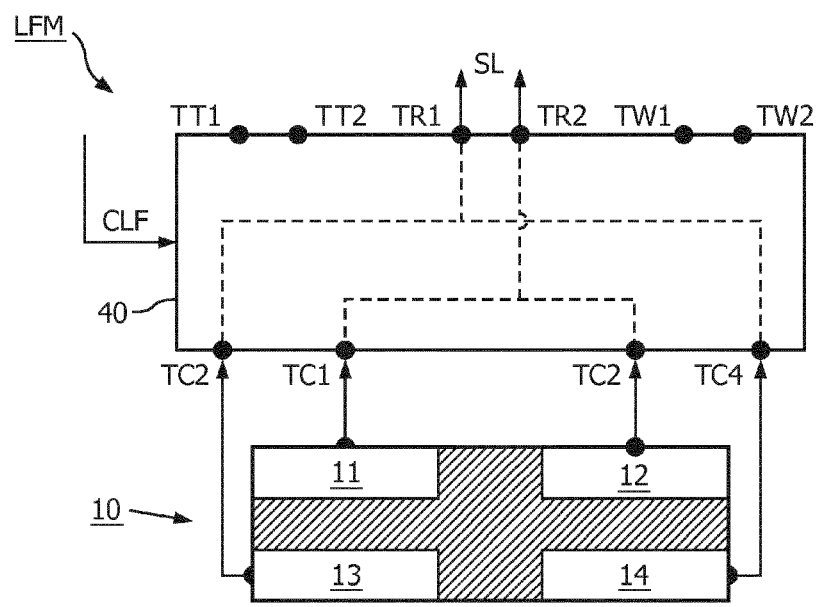

FIG. 4B shows a schematic embodiment of the apparatus 100 in a low frequency mode LFM, wherein the signal electronics 20 are configured to operate with relatively low frequency signals SL, e.g. lower than the high frequency signals SH. In one embodiment, the mode selector is operable to switch the apparatus between the high frequency mode HFM and the low frequency mode LFM wherein the routing network 40 is controlled to connect one or more additional couplers 12,14 to the signal electronics 20 in the low frequency mode LFM compared to the high frequency mode HFM. By adding additional couplers, a total coupling surface can be increased which may lead to more efficient coupling at relatively low frequencies.

Figure 5A:
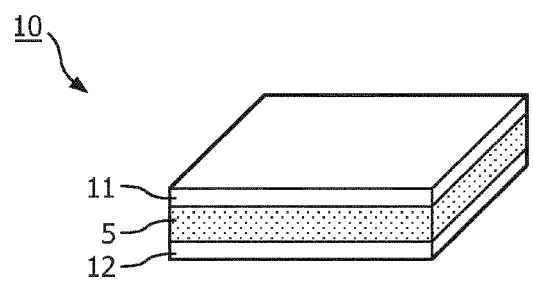
FIGS. 5A-5C illustrate embodiments of coupler arrangements.

FIG. 5A shows an embodiment of a coupler arrangement 10 comprising a vertical (stacked) arrangement of couplers 11,12. In the embodiment, the conductive couplers are shaped as parallel plates and separated by a non-conductive material 5.

Figure 5B:
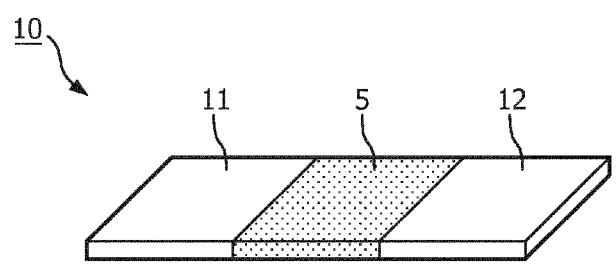

FIG. 5B shows an embodiment of a coupler arrangement 10 comprising a horizontal (side by side) arrangement of couplers 11,12 separated by a non-conductive material 5.

Figure 5C:
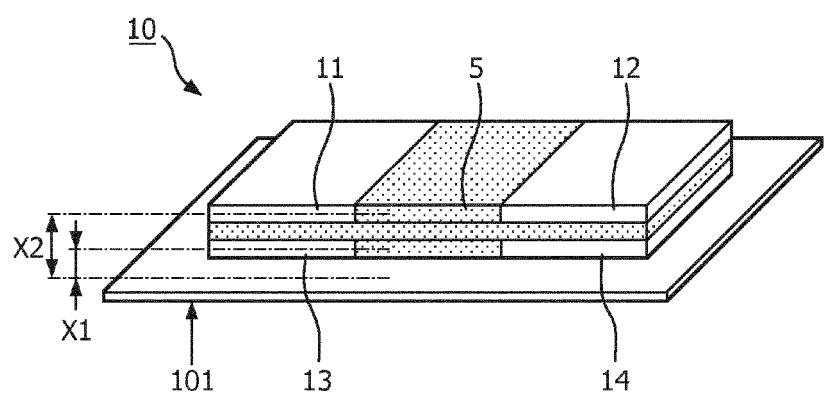

FIG. 5C shows another embodiment of a coupler arrangement 10 wherein the couplers 11,12,13,14 are arranged both horizontally (side by side) and vertically (stacked) with respect to each other and a surface 101 of the apparatus.

In one embodiment, the coupler arrangement 10 comprises at least first and second couplers 12,13 disposed at a first distance X1 from an outer surface 101 of the apparatus 100, and a third coupler disposed at a second distance X2 from the outer surface 101, wherein the second distance X2 is larger than the first distance X1. Of course also other arrangements can be envisaged that can provide a combination of different coupling modes. For example, additional couplers can be added in a stacked or side by side fashion. Also, couplers can be combined, e.g. couplers 11 and 12 may be connected to form a single coupler, similar to the embodiment shown in FIGS. 1 and 2.

Figure 6A:
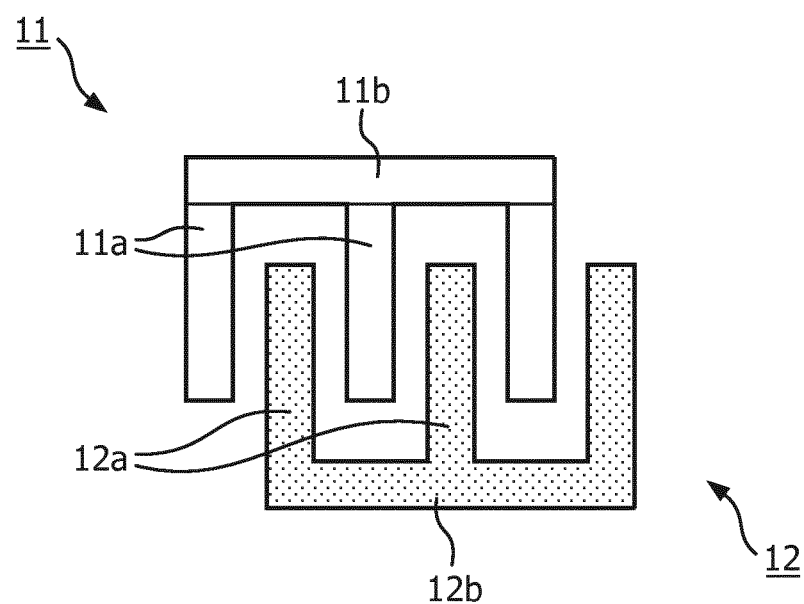
FIGS. 6A and 6B illustrate further embodiments of coupler arrangements.

FIG. 6A shows an embodiment of a coupler arrangement with comb-like structures. In one embodiment, a first coupler comprises a first comb structure 11 and a second coupler comprises a second comb structure 12. Each comb structure is formed by a plurality of conducting lines 11a,12a disposed parallel to each other and connected by a conducting base line 11b,12b transverse to the parallel conducting lines 11a,12a. The first and second comb structures 11,12 are disposed at or near a surface of the apparatus (not shown here) and facing each other with the parallel lines 11a of the first comb structure 11 intertwined with the parallel lines 12a of the second comb structure 12. In a further embodiment, the mode selector is configured to control the routing network to connect the first and second couplers with comb structures 11,12 when switching to a high frequency mode and disconnect at least one of the first and second couplers with comb structures 11,12 when switching to a low frequency mode.

Figure 6B:
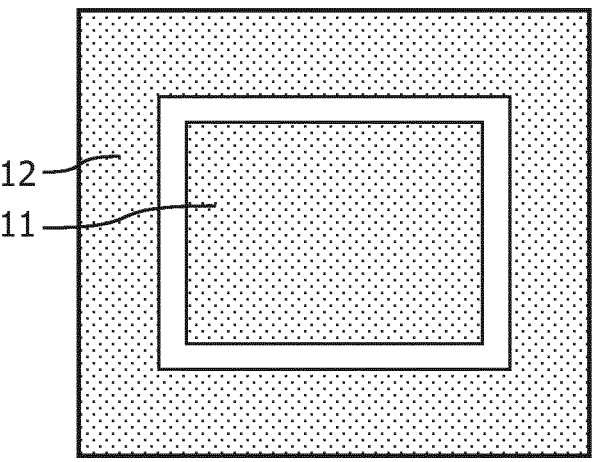

FIG. 6B shows an embodiment of a coupler arrangement wherein a first coupler 11 is enclosed by a second coupler 12. Be selectively connecting either the first coupler 11, or both couplers 11 and 12, a coupling surface can be enlarged, e.g. providing better coupling at lower frequencies.

Without wishing to be bound by theory, the creation of the electrostatic field and the propagation of signals in that field can be understood and visualized by a network of capacitances. This network can also reveal the nodes between which the capacitances are created and the factors that determine the impact on the channel and respectively on the quality of the communication. In a capacitive model of the BCC channel and signal propagation can be derived and verified with simulations and measurements. Such model can reveal the existence of a capacitive network of a minimum number of capacitances that represents with high accuracy the operation of the BCC in different use-cases. An example for of the model is given in FIGS. 7A-7C, where the annotations use the following abbreviations:

b human body
g ground reference plane
it inner plate of transmitter (directed towards the body)
ot outer plate of transmitter (directed away from the body)
ir inner plate of receiver (directed towards the body)
or outer plate of receiver (directed away from the body)

Figure 7A:
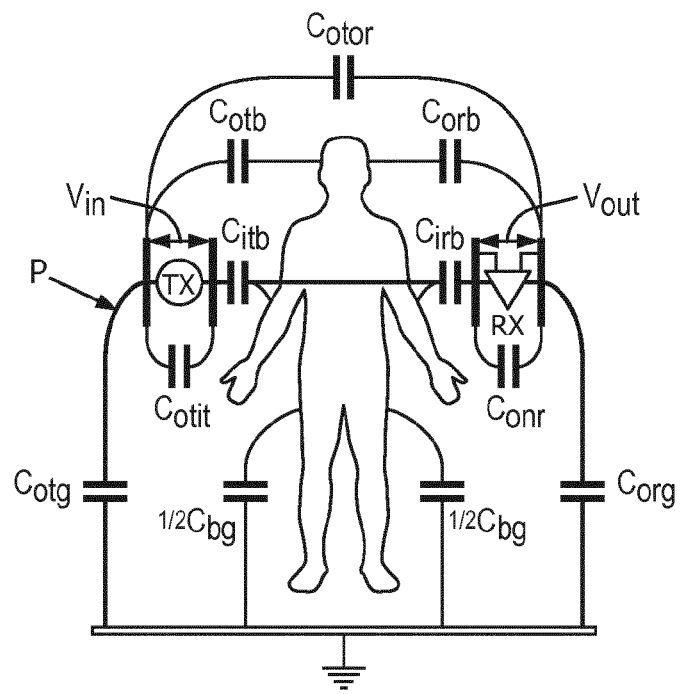
FIGS. 7A-7C illustrates a model of various communication paths in a BCC system.
Figure 7B:
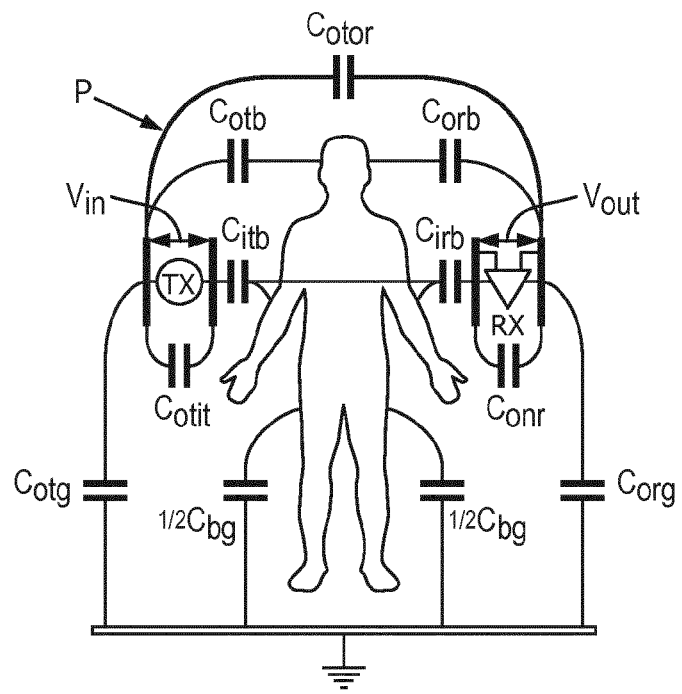

The figures illustrate the possibility for different communication paths that are determined by the construction of the system or by the way the user utilizes the BCC devices. In particular:

FIG. 7A shows the main communication path "P" in a BCC system when receiver RX and transmitter TX are not in close proximity FIG. 7B shows the main communication path "P" in a BCC system when receiver RX and transmitter TX are in close proximity.

Figure 7C:
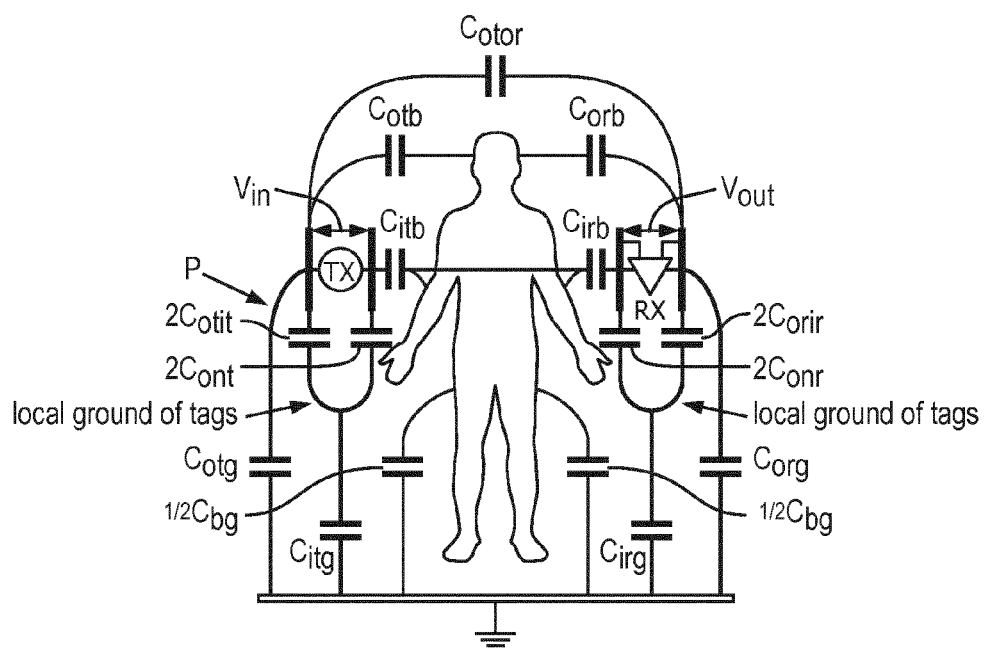

FIG. 7C shows the main communication path "P" in a BCC system when receiver RX and transmitter TX are part of other devices, e.g. as smart phone, laptop, etc. The term "close proximity" between TX and RX indicates system implementation in which the direct capacitive coupling between them (represented as Cotor) is higher than the capacitive coupling to ground (given by Cotg and Corg). In one embodiment, a BCC apparatus comprises a sensor to determine the main communication path, wherein the mode selector is configured to select an operational mode (e.g. high or low frequency) depending on the determined communication path and control the routing network to select a corresponding coupling mode. Alternatively, or in addition, the sensor may be configured to determine a position of the apparatus on the body to control the mode selector. The mode selector may also be triggered to select a specific mode in other ways, e.g. on the basis of user input, and control the routing network to select the corresponding coupling mode.

In a measurement example, it was found that when both TX and RX use horizontal plate configuration the attenuation is highest. In contrast, if horizontal TX plate configuration is used while RX uses vertical plate configuration, for some frequency ranges, an improvement of about 10 dB in terms of signal strength can be achieved. The actual frequency for which this effect is taking place depends also on the plates' size and location on the body and in respect to the channel surroundings.

In one embodiment the system changes the couplers' configuration in respect to the communication mode of operation such that in TX mode all couples are have maximum surface towards the body (e.g. FIG. 2A), while in RX mode the couplers' surface to ground (FGND or GND) is at least equal to the surface towards the body (e.g. FIG. 2B). In another embodiment the couplers and an input impedance circuit network are configured for best performance for wake-up signals (e.g. FIG. 3). In case of a narrow-band wake-up receiver this can be efficiently implemented with passive LC/RC resonator that processes only the dedicated WU signal. Alternatively, or in addition, an active circuit can be used to amplify the WU signal. In another embodiment, as depicted in FIGS. 5 and 6, several major coupler configurations are described that have specific use case. The use case for these couplers can be established for example in software by monitoring the purpose of the particular BCC link and determining the mode of operation. In some cases, when the BCC usage can vary because the BCC is incorporated in a hand-held device (smart phone), a measurement for the hand held device can be used to determine the 3D position of the couplers in respect to the human body or the environment. Such a measurement can be done with the help of accelerometers or optically. In one embodiment, a mode selector is configured to switch the apparatus between the operational modes based on a location on the body and adjust the coupling mode accordingly.

Adaptation of the couplers may be effected by the physical construction in which multiple couplers are present in the system. Further, a set of configuration switches can be controlled e.g. by the software to reconfigure the way the couplers are connected. The couplers may represent physical conducting elements that having specific shapes or 3D locations defined in respect to the human body and the environment. Each of the several communication nodes: e.g. transmitter (TX), receiver (RX), wake-up (WU), floating ground (FGND) and earth ground (GND) can be connected to one or combination of couplers via a routing network. Impedance control blocks allow for the modification of the node impedance via switching on/off, of passive or active electric circuits. A coupling mode selection unit may interpret mode settings to realize a desired routing. A mode selection unit with software and hardware components may control the whole system to operate in a particular mode of operation. As illustrated in the embodiments, the modes can have a specific function e.g. receiver, wake-up, transmit or can be associated with a particular device location like wrist, in hands, in the environment, or with frequency of the transmission.

For the purpose of clarity and a concise description, features have been described herein as part of the same or separate embodiments, however, it will be appreciated that the scope of the invention may include embodiments having combinations of all or some of the features described. For example, while embodiments were shown for body coupled device with certain arrangements or combinations of signal electronics and couplers, also alternative ways may be envisaged by those skilled in the art having the benefit of the present disclosure for achieving a similar function and result. For example electrical components and structures may be combined or split up into one or more alternative components. The various elements of the embodiments as discussed and shown offer certain advantages, such as adapting a coupling efficiency based on a mode of operation. Of course, it is to be appreciated that any one of the above embodiments or processes may be combined with one or more other embodiments or processes to provide even further improvements in finding and matching designs and advantages. It is appreciated that this disclosure offers particular advantages body coupled communication, and in general can be applied for any application wherein coupling efficiency may vary depending on the operating mode.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. A body-coupled communication apparatus configured to be placed at or in close proximity to a human or animal body for transmitting and receiving a signal via the body, the apparatus comprising:
   a coupler arrangement comprising a plurality of couplers configured to couple the signal between the apparatus and the body;
   a first processor configured to process the signal depending on operational modes of the apparatus;
   a routing network configured to provide variable routing of the signal between the first processor and the couplers such that a selection is made among coupling modes of the coupler arrangement, wherein the selection of each coupling mode is made by selecting a coupler arranged to provide a coupling impedance for coupling the signal between the apparatus and the body; and
   a second processor configured to switch the apparatus among the operational modes and control the routing network to select between the coupling modes based on the operational mode of the apparatus, the second processor being operable to switch the apparatus between a low frequency mode, in which the first processor is configured to operate with low frequency signals, and a high frequency mode, in which the first processor is configured to operate with high frequency signals; wherein the routing network is controlled to connect at least one additional coupler to the first processor in the low frequency mode for increasing a total coupling surface of the couplers.

2. The apparatus according to claim 1, wherein the second processor is operable to switch the apparatus among:
   an operational transmitter mode in which a transmitter is controlled to generate the signal, and the routing network is controlled to provide a transmitter coupling mode in which at least one coupler is connected to the transmitter;
   an operational receiver mode in which a receiver is controlled to process the signal, and the routing network is controlled to provide a receiver coupling mode in which at least one coupler is connected to the receiver; and
   an operational sleep mode in which a wakeup part is controlled to detect a wakeup signal, and the routing network is controlled to provide a wakeup coupling mode in which at least one coupler is connected to the wakeup part.

3. The apparatus according to claim 1, wherein the routing network is operable to provide at least
   a first coupling mode, wherein a first set of the couplers is connected to the first processor; and
   a second coupling mode, wherein a second set of the couplers is connected to the first processor, wherein one or more couplers are part of both the first set and the second set of couplers.

4. The apparatus according to claim 1, wherein the routing network is operable to provide at least
- a first coupling mode, wherein a first coupler of the coupler arrangement is connected to a first signal node; and
- a second coupling mode, wherein the first coupler of the coupler arrangement is connected to a second signal node that is different than the first signal node.

5. The apparatus according to claim 1, wherein the coupler arrangement comprises a plurality of separately connectable conductive plates acting as the couplers.

6. The apparatus according to claim 5, wherein the plates are disposed parallel to an outer surface of the apparatus.

7. The apparatus according to claim 1, wherein the coupler arrangement comprises at least
- first and second couplers disposed at a first distance from an outer surface of the apparatus; and
- a third coupler disposed at a second distance from the outer surface, wherein the second distance is larger than the first distance.

8. The apparatus according to claim 1, wherein a first coupler comprises a first comb structure and a second coupler comprises a second comb structure, each comb structure being formed by a plurality of conducting lines disposed parallel to each other and connected by a conducting base line transverse to the parallel conducting lines; wherein the first and second comb structures are disposed at or near a surface of the apparatus and facing each other with the parallel lines of the first comb structure intertwined with the parallel lines of the second comb structure.

9. The apparatus according to claim 8, wherein the second processor is configured to control the routing network to connect the first and second couplers with the comb structures when switching to a high frequency mode and disconnect at least one of the first and second couplers from the comb structures when switching to a low frequency mode.

10. The apparatus according to claim 1, wherein an impedance control circuit is connected in an electrical pathway between the first processor and one or more of the couplers.

11. The apparatus according to claim 1, wherein the routing network is configured to provide a wakeup coupling mode, wherein a resonator circuit is connected in an electrical pathway between a wakeup part and at least one coupler, the resonator circuit having a resonance frequency coinciding with a frequency of a wake up signal that triggers the wakeup part to wake the apparatus from an operational sleep mode.

12. The apparatus according to claim 1, wherein the second processor is operable to switch the apparatus between a low impedance mode and a high impedance mode, wherein the second processor is configured to control the routing network to change an input or output impedance of the couplers by switching an impedance control circuit between the first processor and the couplers.

13. A method for body-coupled communication, comprising:
- providing a body-coupled communication apparatus at or in close proximity to a human or animal body;
- setting the apparatus to a first operational mode and processing and generating a signal depending on the operational mode by a second processor;
- selecting a first coupling mode that determines a coupling between the apparatus and the body, wherein the selecting of the first coupling mode comprises selecting a first coupler arranged to provide a first coupling impedance between the apparatus and the body;
- transmitting and receiving the signal via the body in the first operational mode by coupling the signal between the apparatus and the body in the first coupling mode; and
- switching the apparatus to a second operational mode and selecting a second coupling mode based on the second operational mode of the apparatus, wherein selecting the second operational mode comprises selecting a second coupler, and wherein the second coupling mode includes a second coupling impedance between the apparatus and the body, the second processor being operable to switch the apparatus between a low frequency mode, in which a first processor is configured to operate with low frequency signals, and a high frequency mode, in which the first processor is configured to operate with high frequency signals; wherein at least one additional coupler is connected to the first processor in the low frequency mode for increasing a total coupling surface of the couplers.

14. A non-transitory computer-readable medium having one or more executable instructions stored thereon, which when executed by a processor, cause the processor to perform a method for body-coupled communication, the method comprising:
- providing a body-coupled communication apparatus at or in close proximity to a human or animal body;
- setting the apparatus to a first operational mode and processing and generating a signal depending on the operational mode by a second processor;
- selecting a first coupling mode that determines a coupling between the apparatus and the body, wherein the selecting of the first coupling mode comprises selecting a first coupler arranged to provide a first coupling impedance between the apparatus and the body;
- transmitting and receiving the signal via the body in the first operational mode by coupling the signal between the apparatus and the body in the first coupling mode; and
- switching the apparatus to a second operational mode and selecting a second coupling mode based on the second operational mode of the apparatus, wherein selecting the second operational mode comprises selecting a second coupler, and wherein the second coupling mode includes a second coupling impedance between the apparatus and the body, the second processor being operable to switch the apparatus between a low frequency mode, in which a first processor is configured to operate with low frequency signals, and a high frequency mode, in which the first processor is configured to operate with high frequency signals; wherein at least one additional coupler is connected to the first processor in the low frequency mode for increasing a total coupling surface of the couplers.

* * * * *